July 22, 1924.
J. N. McQUEEN
1,501,964
DEMOUNTABLE RIM
Filed Dec. 19, 1921
2 Sheets-Sheet 2
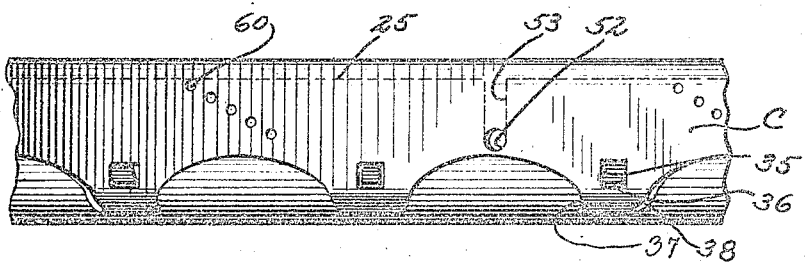
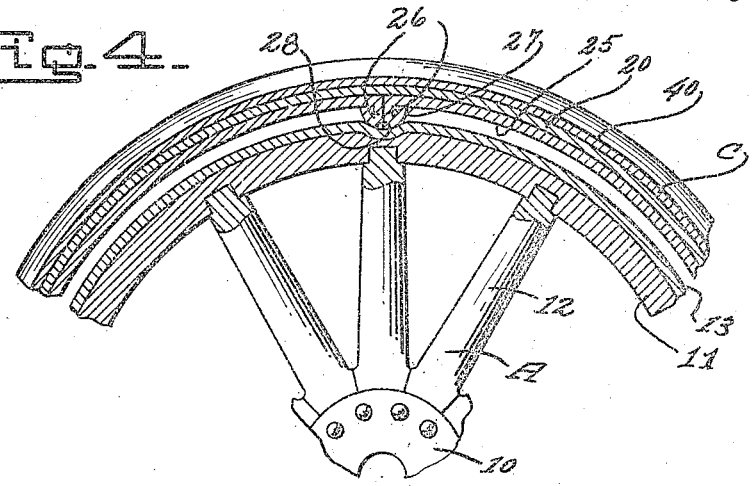
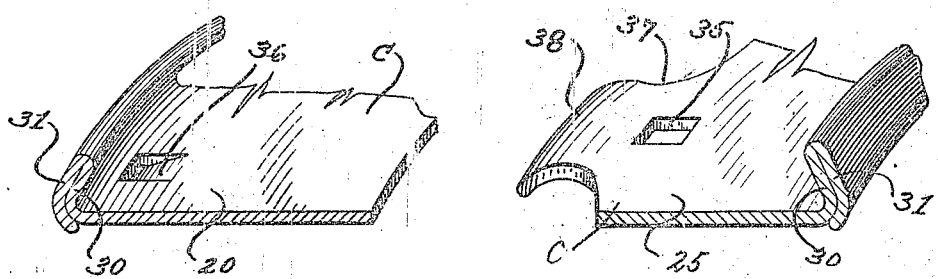
Inventor
John N. McQueen
By (signature)
Attorneys Patented July 22, 1924.

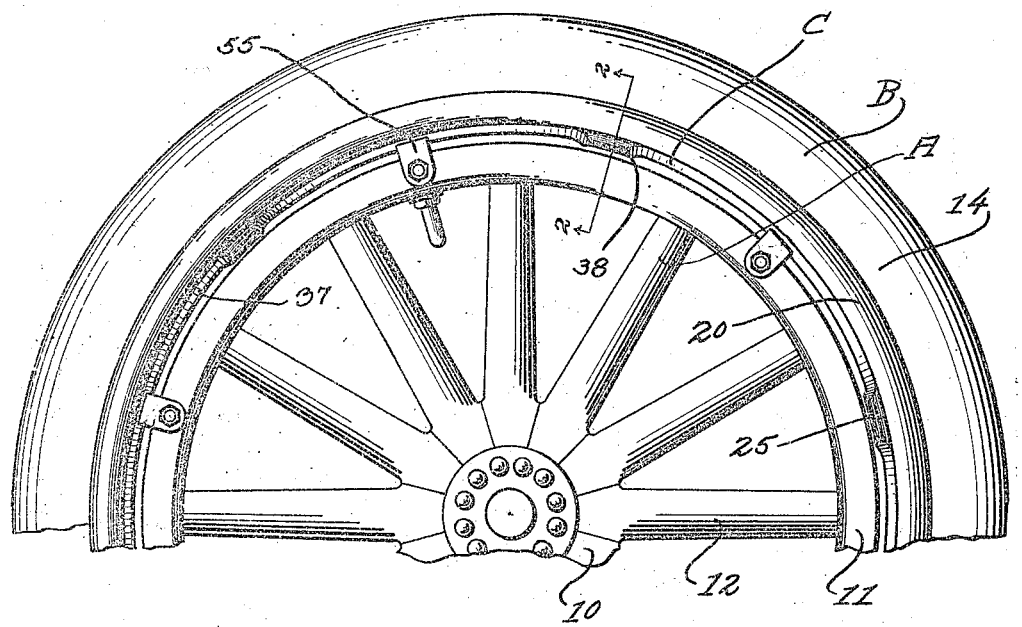
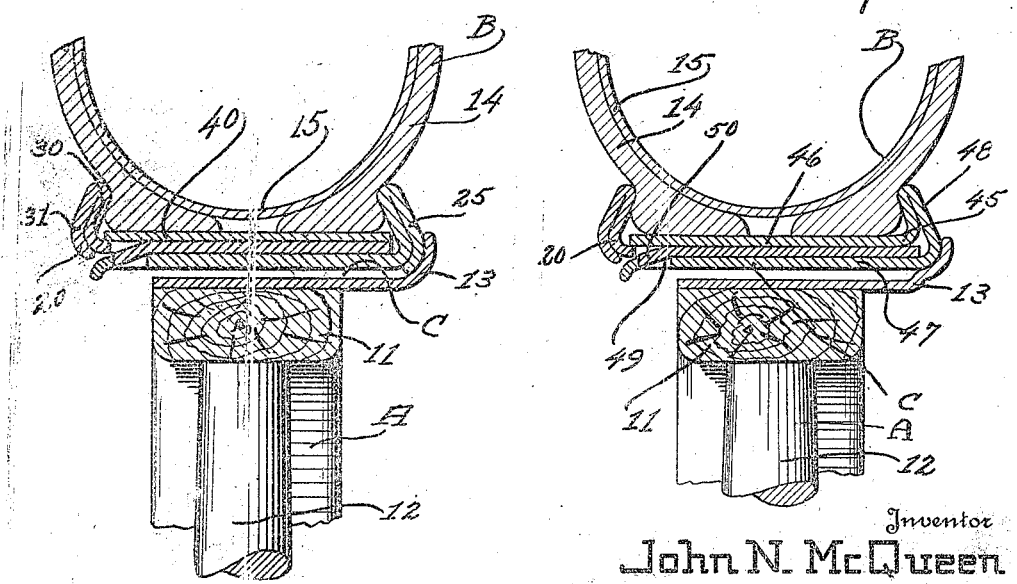

1,501,964

UNITED STATES PATENT OFFICE.

JOHN N. McQUEEN, OF PRESTON, IDAHO.

DEMOUNTABLE RIM.

Application filed December 19, 1921. Serial No. 523,477.

*To all whom it may concern:*

Be it known that I, JOHN N. McQUEEN, a citizen of the United States, residing at Preston, in the county of Franklin and State of Idaho, have invented certain new and useful Improvements in Demountable Rims, of which the following is a specification.

This invention relates to vehicle wheel rims of the sectional and demountable type, and the primary object of the invention is the provision of an improved rim having novelly associated sections, which can be readily and quickly removed or placed together in order to facilitate the removing or the placing of a tire on or off the rim, the sections being so formed whereby the rupturing of the inner tube is absolutely precluded.

A further object of the invention is the provision of a tire rim embodying a pair of interfitting annular sections having tire rim engaging flanges formed on their outer edges and novel locking means, whereby the structures will be automatically locked in relation to each other, when the rim is in its assembled position.

A further object of the invention is the provision of means for facilitating the unlocking of the sections to permit the easy and convenient separation thereof when it is desired to remove a tire from off of the rim.

A further object of the invention is the provision of means carried by one of the sections or associated with the sections for forming a smooth inner surface for engaging the tire, thereby insuring a perfect seat for the tire and preventing the injuring of the inner tube or the side walls of the tire casing.

A still further object of the invention is the provision of an improved sectional rim of the above character having novel tire engaging flanges formed thereon, which add rigidity to the sections which can be made more or less of a resilient nature and which permit the sections to be made of flat pieces of sheet metal if so desired.

With these and other objects in view, the invention consists in the novel construction, arrangement and formation of parts, as will be hereinafter more specifically described, claimed and illustrated in the accompanying drawings, forming a part of this specification, in which drawings:

Figure 1 is a fragmentary side elevation of a vehicle wheel and tire showing the improved rim associated therewith.

Figure 2 is a fragmentary sectional view through the wheel, rim and tire, taken on the line 2—2 of Figure 1.

Figure 3 is a fragmentary inner plan view of the improved rim.

Figure 4 is a fragmentary circumferential sectional view through the improved rim and the vehicle wheel showing one means of connecting the terminals of the sections together when the same are made from strips of sheet metal.

Figure 5 is a fragmentary detail sectional view of the outer section of the improved rim.

Figure 6 is a similar view of the inner section of the improved rim.

Figure 7 is an enlarged fragmentary transverse section through a portion of the improved tire rim showing the same applied to a tire and wheel, the tire and wheel also being shown in section and illustrating a slightly modified form of the improved rim.

Referring to the drawings in detail, wherein similar reference characters designate corresponding parts throughout the several views, the letter A indicates a vehicle wheel; B, a vehicle tire; and C, the improved vehicle rim.

The vehicle wheel A can be of the usual or any preferred construction and has been shown merely to illustrate the application of the improved rim and includes the hub 10; the felly 11; and the connecting spokes 12. The felly 11 may be provided with a metallic felly band 13 if so desired.

The tire B has also only been shown to illustrate the application of the rim, and is also of the ordinary construction of any preferred type, and as shown consists of the usual casing 14 and inner tube 15.

The improved rim C is of a novel construction and has been formulated with two distinct ideas in view; first, to facilitate the placing and removing of tires on and off of vehicle rims; and second, to absolutely preclude the possibility of the inner tube being folded over or pinched during the application of a tire to a rim. The rim, to carry out these two ideas, consists primarily of two annular sections 20 and 25. The section 20 is preferably disposed at the outer side of the wheel, while the section 25 is disposed on the inner or vehicle body side of the wheel. Each of the sections 20 and 25 are preferably formed from a strip of flat metal of the desired gauge, and then bent to form the annular body. The terminals of the strips can then be brazed or welded together, or as shown in Figure 4 of the drawings, the section 25 may have its terminals forced inwardly to provide right angularly extending abutting flanges 26 and then outwardly to form ears 27. This forms a lug, which can be utilized for preventing circumferential movement on the wheel felly 11 and the felly band 13 may be provided with a depression 28 for receiving the said lug thus formed.

The outer edges of the rim sections 20 and 25 are bent arcuately as at 30 to provide means for engaging the side walls of the tire, and it is preferred that these flanges be bent back upon themselves as at 31 and into engagement with the inner surface of the sections, in order to reinforce the said flanges and the rim sections. The tire engaging beads or flanges are formed in the above described manner, as it is preferred that the sections be formed of more or less resilient metal.

The section 25 is provided at equi-distantly spaced points throughout its circumference with openings 35, which constitute keepers for the tongues 36 struck out from the section 20. The openings 35 are disposed adjacent to the inner edge of the section 25, while the struck out rigid tongues 36 are disposed adjacent to the outer edge of the sections 20, and it can be seen that when the sections are placed in abutting engagement with one another, that the rigid tongues 36 will project into the openings 35 and thus prevent the parting of the sections and hold the same in a locked assembled position.

The inner edge of the section 25 is cut out or scalloped at predetermined spaced points as at 37, to provide resilient flanges 38, which may be bent inwardly toward the felly of the wheel and these flanges 38 are formed in alignment with the openings 35 for a purpose which will be hereinafter more fully described. In order to form a smooth flat seat for the tire B, an annular seat 40 is provided. This seat also forms means for insuring against the pinching of the inner tube. If desirable, this seat 40 can be formed integral with the section 25 and this arrangement is illustrated in Figure 7 of the drawings. In this form of the invention, the inner section is designated by the numeral 45 and consists of two spaced bands 46 and 47, which are connected at their outer edges by a connecting flange 48, which is so shaped as to form means for engaging the tire casing. The band 47 is constructed with openings 49, for the reception of locking lugs 50 on the other section which is constructed exactly like the section 20, and it can be seen that these two sections shown in Figure 7 of the drawings cooperate in the same manner as the two sections illustrated in the other figures of the drawings. In the form shown in Figure 7 of the drawings, it can be seen, however, that the section 20 is adapted to slidably fit between the bands 46 and 47.

In use of the improved rim, when it is desired to apply a tire thereto, the section 25 is laid flat upon the ground or other suitable support, and the band or seat 40 is then slid in position thereon and as this band is of a greater diameter than the section 25, a space is formed intermediate the said band or seat and the section 25. The tire is then assembled, that is, the tube is placed within the tire casing, care being taken that the tube is not wrinkled and the tire is then slid on the seat or band 40. It can be seen that there is no obstacle in the way of placing the tire in position. The free edge of the section 20 is then inserted between the band or seat 40 and the section 25 and is gently slid into position until the locking tongues 36 spring into openings or seats 35. The seat 40 and the section 25 are of course provided with openings for the reception of the tire valve, as indicated at 52 and the inner edge of the section 20 can be provided with a slot 53 for accommodation of the stem when this section is being slid into position. It is preferred that the lug formed by the flanges 26 and 27 be positioned diametrically opposite the tire valve so as to form means for preventing the circumferential creeping of the rim on the felly. The tire is then inflated in the ordinary manner and the rim can be readily slipped on the wheel felly. The rim can be held in any preferred manner on the felly and ordinary lugs 55 can be used if so desired. It can be seen that the rim forms a convenient means for carrying spare tires in an inflated condition, without hurting the tires or rim in any way whatsoever. When it is desired to remove the tire from the rim for any purpose whatsoever, it is merely necessary to take a suitable instrument, such as a screw driver, and insert the same between the resilient flanges 38 and the section 20 and spring these flanges down until the locking tongues 36 ride out of the openings or seats 35. The section 20 is moved gently outwardly as each one of the resilient flanges is flexed. After the section 20 has been moved to a point where all of the locking tongues 36 lie beyond the openings in the section 25, the section 20 is simply slid outwardly, which will permit the convenient and expeditious removal of the tire from the rim.

In the modification shown in Figure 7, the same procedure is gone through with the assembling and the taking apart of the rim, the only difference being that the section 20 is placed between the portions 46 and 47 instead of between the separate band or seat 40 and section 25.

Provision has been made for permitting the sections to be forced apart, in case the same become wedged together by dirt or the like, or in case the same become rusted, and this means consists of rows of openings 60 formed in the section 25. These rows of openings 60 extend inwardly at an incline so as to prevent the weakening of the rim directly transversely of the same. The rows of openings 60 are disposed at equi-distantly spaced points circumferentially around the rim. If the sections of the rim stick together for any reason, it is merely necessary to insert a suitable tool, such as a screw driver, punch or the like in the first opening of one of the rows of openings 60 and rest the same upon the inner edge of the section 20 and then move the tool as a lever. After the sections have been slid apart a certain space, the tool is inserted in the second opening and then used as a lever. This operation is continued until the sections are entirely separated.

From the foregoing description, it can be seen that an improved sectional tire rim has been provided which will permit the convenient and expeditious removing or placing of a tire off and on a rim, without danger of injuring or pinching the inner tube.

The formation of the resilient flange 38 forms an important part of the invention and this permits the convenient flexing of the section 25 in order to permit the portions of the sections having the openings therein being moved below the locking tongues 36.

Changes in details may be made without departing from the spirit or scope of this invention; but,

I claim:

1. A wheel rim for vehicle tires comprising band sections telescopically connected together, locking seats formed in one of the sections adjacent to the outer edge thereof, and rigid locking tongues carried by the other section, adjacent to the outer edge thereof for engaging in said seats when the sections are disposed in their assembled operative tire engaging position.

2. A wheel rim for vehicle tires comprising a pair of annular band sections telescopically connected, one of said sections having a plurality of seats formed therein adjacent to the outer edge thereof, the other section having a plurality of rigid tongues disposed thereon adjacent to the outer edge thereof for fitting in said seats, the section having the seats therein being provided with a plurality of flexible flanges for facilitating the flexing of said section to spring the same inwardly of the rigid locking tongues when it is desired to separate said sections.

3. In a sectional wheel rim for pneumatic tires, a pair of sliding and telescopic sections, each of said sections including an annular body and outturned flange formed on one circumferential edge of the body and a bent back flange formed on the last mentioned flange arranged in abutting relation to said first mentioned flange and terminating adjacent to said body.

4. In a sectional wheel rim for pneumatic tires, a pair of sliding and telescoping sections, said sections being formed of a flat elongated strip of metal, bent to form an annular body, the terminals of the inner section being forced inwardly to provide right angularly extending abutting flanges and then outwardly to form ears, providing a felly engaging lug for preventing circumferential movement of the inner section and means for locking the sections together.

5. A wheel rim for vehicle tires comprising a pair of annular band sections telescopically connected together, means for automatically locking the sections together against accidental movement in relation to one another, one of said sections having a plurality of spaced tool receiving openings, the openings terminating at a point adjacent to the inner edge of the other section as and for the purpose described.

JOHN N. McQUEEN.